Dec. 28, 1937.         I. BENCOWITZ         2,103,741

FLOWMETER

Filed March 12, 1932

INVENTOR
ISAAC BENCOWITZ
BY
Pennie Davis, Marvin & Edmonds
ATTORNEYS

Patented Dec. 28, 1937

2,103,741

UNITED STATES PATENT OFFICE 2,103,741

FLOWMETER

Isaac Bencowitz, New York, N. Y., assignor to Texas Gulf Sulphur Company, a corporation of Texas Application March 12, 1932, Serial No. 598,529

2 Claims. (Cl. 73—205)

This invention relates to fluid measurement and has for an object the provision of certain improvements in apparatus and methods for measuring and recording the flow of fluids. More particularly, the invention contemplates the provision of an improved electrical method and improved electrical apparatus for fluid measurement. In one of its more limited aspects, the invention contemplates the provision of an improved electrical apparatus of the vacuum tube type for measuring and recording the quantity of fluid passed through a pipe or other confining element.

Measurement of the flow of high temperature liquids such, for example, as molten sulphur by means of the heretofore customary methods and apparatus has presented many difficulties. The difficulties have resulted chiefly from lack of sensitiveness of the apparatus in responding to slight changes in flow coupled with lack of accuracy in responding to large variations in flow.

It has been proposed heretofore to measure quantities of liquid material flowing through pipes, channels or other confining elements by means of electrical instruments. The heretofore proposed type of electrical apparatus is incapable of functioning continuously in a uniformly satisfactory manner.

The present invention contemplates the substantial elimination of many of the difficulties experienced in measuring and recording the flow of fluids by means of electrical apparatus.

The invention provides a method and apparatus for measuring the flow of a fluid by means of reactance changes caused by variations in the flow of the fluid.

The apparatus of the invention preferably comprises an electrical system of the vacuum tube type in which a variable reactance under the influence of a flowing liquid is varied to indicate the flow of the liquid. Such apparatus further comprises an electrical measuring and recording system in which a conduit through which a liquid flows is provided with means responsive to the liquid flow to actuate a variable reactance and cause measurements of the liquid flow to be recorded.

Apparatus produced in accordance with the invention may comprise electrical measuring apparatus of the vacuum tube type in which variations in the capacity of a condenser, caused by variations in the flow of a liquid, impose energy changes in the vacuum tube system. In the operation of such apparatus, variations in the condenser capacity cause changes in the oscillating frequency of the vacuum tube system which in turn registers a measure of the fluid flow.

In a preferred embodiment of the invention the liquid to be measured, such for example, as molten sulphur, tar or oils, is passed through a conduit in which an orifice creates a pressure gradient on the liquid. The differences in pressure on the liquid cause variations in associated reactances which reactance variations are imposed upon a vacuum tube system to actuate a recording instrument.

The invention will be better understood from a consideration of the following description in conjunction with the accompanying drawing, in which Fig. 1 is a circuit diagram of two interconnected oscillating vacuum tube circuits;

Figure 1:
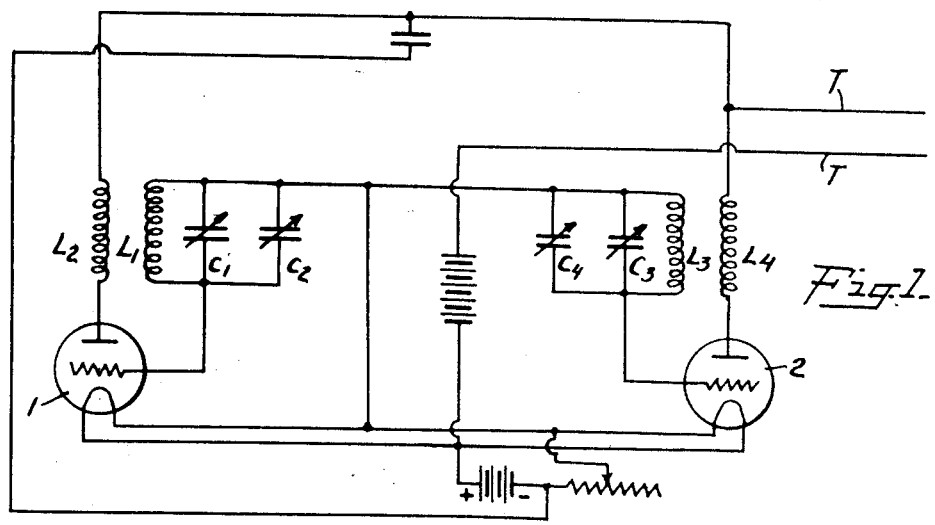

In the apparatus of Fig. 1 are vacuum tubes 1 and 2, each placed in its own oscillating vacuum tube circuit, which circuits are interconnected. There is an inductance $L_1$ in the grid circuit of tube 1 that is bridged by two condensers $C_1$ and $C_2$ for tuning the circuit to the proper frequency. In the plate circuit of tube 1 an inductance $L_2$ is inductively coupled to $L_1$ to cause the tube to oscillate.

In the grid circuit of tube 2 is connected an inductance $L_3$ which is bridged by two condensers $C_3$ and $C_4$ for tuning the circuit to the proper frequency. In the plate circuit of tube 2, an inductance $L_4$ is inductively coupled to $L_3$ for the purpose of causing tube 2 to oscillate.

The condensers $C_1$ and $C_3$ are adjustable for the purpose of calibration and, once set, may remain fixed.

A pipe 3, in which the fluid to be measured flows, has a restricting orifice 4 therein to cause pressure differences within the pipe adjacent the orifice. Conveniently located liquid risers 5, one on each side of the orifice, serve as a means responsive to a pressure difference on the flowing liquid.

Figures 3, 4:
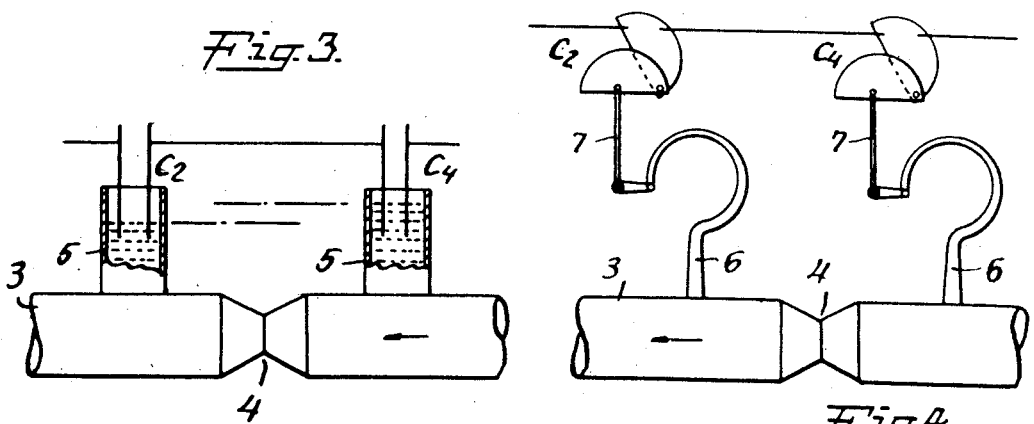
Fig. 3 shows variable condensers in operating position in a liquid on the high and on the low pressure sides of an orifice.
Fig. 4 is a diagram of a fluid conducting pipe equipped with Bourdon tubes for actuating variable condensers.

The condenser $C_2$ is shown in Fig. 3 on the low pressure side of the orifice 4 and is the variable condenser of the number 1 tube circuit. The condenser C4 is shown in Fig. 3 on the high pressure side of the orifice and is the variable condenser of the number 2 tube circuit.

Portions of the plates of the condensers C2 and C4 are submerged in the liquid within the risers 5, in one manner of operation. The air between the condenser plates has a certain dielectric value and the liquid a different dielectric value. Changes in the pressure of the liquid cause variations in the levels of the risers 5. As the liquid rises, the air between the condenser plates is displaced and the capacity changed. Variations in the liquid level will thus vary the condensers by changing the specific inductive capacity of the dielectric between the plates. This variation in capacity is, in turn, used as a measure of the height of the liquid in the two columns. The difference in the height of the two columns of liquid is a measure of the liquid flow. A great number of different kinds of liquids can be measured in this way. It is not necessary that the liquid to be measured actually contact the condenser. A liquid of the proper dielectric value having other desirable physical and chemical characteristics may be placed in the riser, over the liquid to be measured, to form the actual contact with the condenser. The liquid for such use should be immiscible in the liquid being measured.

In the modification of the invention shown in Fig. 4, the apparatus is adaptable to the measurement of liquids as well as gases and is particularly adapted to the measurement of highly heated liquids. Highly heated liquids tend to behave like gases because of the increased vapor tension and tendency to volatilize. This modification provides a completely closed system. The pipe 3 has a restricting orifice 4 to provide a pressure difference on each side of the orifice. Two tubes 6 of the Bourdon type are connected to the pipe, one on each side of the orifice. The condensers C2 and C4 when employed on this modification are of the conventional metal plate type, in which one plate is a stator and the other a rotor. The rotatable plates are connected through a link 7 to the Bourdon tubes. It is well known that the curved portion of the Bourdon tube undergoes an arcuate movement during changes in pressure of the fluid within the tube. It is this arcuate motion that is transmitted through the link 7 to the rotors of the condensers C2 and C4. Differences in pressure within the pipe will cause the Bourdon tubes to vary the capacity of the condensers.

Figure 5:
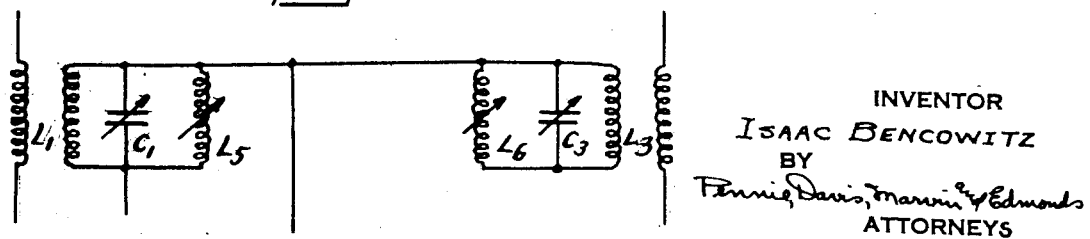
Fig. 5 shows the application of a variable inductance coil to the tuned circuits shown in Fig. 1.

In similar manner the Bourdon tubes 6 may be connected to variable coils such as those shown in Fig. 5, as L5 and L6 which are tuning inductances that may be substituted in the tuned circuits of tubes 1 and 2 in place of condensers C2 and C4. The variations which differences in pressure on the Bourdon tubes undergo are passed to the variable coils which in turn impose changes upon the vacuum tube system that are translated into a measure of the liquid flow in a manner similar to that which has been described in the use of the variable condensers.

The two oscillating tube circuits of Fig. 1 are interconnected after the familiar manner of the heterodyne principle used in radio receivers. The two circuits are tuned to high frequencies by means of the condensers C1 and C3, and, when modulated, the interaction of these two high radio frequencies, if of different value, produces a resultant low audio frequency which is the arithmetic difference between the two radio frequencies.

Figure 2:
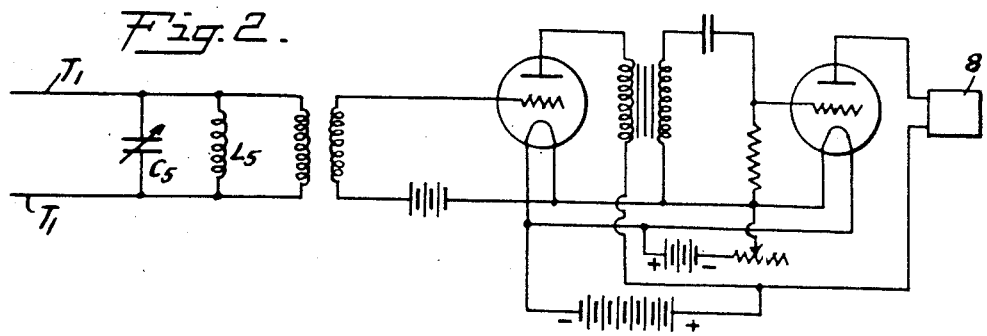
Fig. 2 is a circuit diagram of a meter actuating amplifier having a meter connected thereto.

The energy discharged across the terminals T is comparatively feeble and much too low to properly actuate the recording mechanism of a recording meter. The output terminals T of the oscillating system are, therefore, connected to the input terminals T1, of a conventional detector and power amplifier preferably of the multiple tube type shown in Fig. 2. The output of the power amplifier is connected to a recording meter 8 which responds to energy variations therein.

In the operation of the apparatus of the invention the two condensers C2 and C4 are set in the liquid, in one manner of operation, that shown in Fig. 3, when the liquid is at the same height in each riser. The flow should be zero in the pipe. Under such conditions the condensers C1 and C3 may be varied to tune the two circuits to the proper oscillating frequency to produce the desirable resultant lower frequency. When the proper output frequency is obtained, the two condensers C1 and C3 are set and left in a fixed position. In similar manner, in the modifications shown in Figs. 4 and 5 the variable reactances are set in fixed positions when the fluid is not flowing and there is no difference in pressure within the pipe. The adjustment of the condensers C1 and C3 is the means of providing an oscillating frequency of the proper value to place the changed frequency caused by the variable condensers C2 and C4 within the range of usefulness.

When the liquid flows in the pipe the heights of the liquid in the two risers 5 reach different values and as a consequence produce different variations in the capacities of the two condensers C2 and C4. The variations in the capacities of the two condensers in turn, vary the frequency of the output current.

When the output current is passed into the amplifier system, it is very greatly magnified. The output of the amplifier is of sufficient wattage to actuate the recording meter connected across the output terminals. The variations in the tuned wave are carried through the amplifier and amplified to such degree that the magnified variations produce effects on the measuring and recording apparatus that are an indication of the flow in the pipe.

The plates of the variable condensers which are placed under the influence of the liquid pressure are given such characteristic shape that uniform motions due to uniform increments in pressure are translated in terms of straight line readings on the recording instrument.

Calibrations are made by observing the flow of liquid for a given difference in liquid heights and the recording instrument is set accordingly. In such manner the recording meter is calibrated over the entire range of pressure variations in the risers located on the high and on the low sides of the orifice.

I claim:

1. Apparatus for measuring the flow of fluid through a conduit which comprises two variable capacity electrical condensers, means for placing each condenser in operative engagement responsive to variations in pressures at spaced points in the conduit, means for operatively connecting each condenser with a separate oscillating electrical circuit, and means for combining the electrical effects of the separate circuits to indicate a measure of the fluid flow.

2. Apparatus for measuring the flow of fluid through a conduit which comprises an electric recording system including interconnected oscillating vacuum tube circuits, a variable capacity condenser in each circuit, means restricting the passage of said conduit for causing different pressures at spaced points in the conduit upon flow of fluid through the conduit, and means responsive to the different pressures so created by the restricting means for varying the capacities of the condensers, whereby the cumulative electrical effect of the interconnected circuits is varied to indicate a measure of the fluid flow.

ISAAC BENCOWITZ.